Patented Jan. 4, 1949

2,458,603

UNITED STATES PATENT OFFICE 2,458,603

PREPARATION OF KETONES BY CATALYTIC REACTION OF OLEFINS AND ACID ANHYDRIDES

Carl E. Johnson, St. Louis, Mich., assignor to Standard Oil Company, Chicago, Ill., a corporation of Indiana No Drawing. Application April 27, 1946, Serial No. 665,624

5 Claims. (Cl. 260—597)

This invention relates to a method of preparing ketone products from olefin hydrocarbons and acid anhydrides, and particularly it relates to the use of an especially effective catalyst for this reaction. Heretofore the catalysts used for this reaction have produced objectionable side reactions such as polymerization of the unsaturated hydrocarbon ingredient of the reaction mixture. Other difficulties with certain catalysts heretofore employed such as zinc chloride result from their solid form, making them difficult to handle and to recover.

I have now discovered that ketone substances may be prepared by the reaction of olefins and acid anhydrides in the presence of sulfonic acids as catalysts and particularly the alkane sulfonic acids as represented by methane, ethane and propane sulfonic acids. These alkane sulfonic acids may be conveniently prepared by the catalytic oxidation of the corresponding mercaptans such as methyl, ethyl and propyl mercaptans or more conveniently the disulfides, e. g. dimethyl, diethyl and dipropyl disulfides.

The olefins employed in the reaction are ordinarily the monoolefin hydrocarbons such as propylene, butylene, isobutylene, and their dimers, trimers and tetramers. Thus, isobutylene trimer, $C_{12}H_{24}$, may suitably be employed, and mixed unsaturated hydrocarbons found in cracked gasoline may similarly be used, preferably after a preliminary treatment with fuller's earth, phosphoric acid, or diluted sulfuric acid to remove certain of the more unstable olefins. Stocks containing 20 to 60 per cent of unsaturates may be employed instead of pure olefines, the saturated part being rejected from the product by distillation. Thus cracking plant "propane" and "butane" containing about 25 to 40 per cent olefins may be used. Cracked paraffin wax also provides an unsaturated distillate with an unsaturation of 60 to 90 per cent.

Acetic anhydride is preferred as the acid anhydride to be employed in the reaction but I may also use other anhydrides, particularly propionic and butyric acid anhydrides and phthalic anhydride.

In carrying out the reaction, it is preferred to combine the acid anhydride with the olefin material and add the catalyst to the mixture at a controlled rate with good agitation. However, the acid anhydride may be combined with the alkane sulfonic acid, if desired, and the olefin added gradually to the mixture, keeping the temperature under control by adequate cooling. It is desirable to maintain the reaction temperature below about 100° C., which ordinarily will require efficient cooling, for example by a water jacket or suitable cooling coils. Cold regenerated brine coils may be employed for maintaining the reaction temperature below room temperature, i. e. in the range of 10 to 25° C. In general, it is preferred to employ the catalyst in 100 per cent concentration. The amount of catalyst required is relatively little, usually about 1 to 35 per cent of the weight of olefine treated.

After the reaction is completed, the catalyst may be recovered in water solution and reconcentrated to the desired 100 per cent concentration for re-use in the process. In reconcentrating the sulfonic acids, it is desirable to employ a vacuum for concentration above 85%, thus permitting final concentration at a lower temperature, for example, below 100° C.

*Example*

Following is an example of the reaction as applied to a polypropylene fraction boiling in the range of 248 to 269° F. The polypropylene fraction in an amount of 160 ml. was added gradually to a mixture of 100 ml. acetic anhydride and 15 ml. of ethane sulfonic acid. The temperature was maintained in the range of 30 to 80° F. and the mixture agitated for twenty-two hours. A small amount of water was added and the reaction mixture allowed to separate in a layer. The upper oil layer was recovered in the amount of 97% of the polypropylene charged. On distillation it yielded 42.8% by volume of a heavier product boiling above the boiling range of the polypropylene and 57.2% of a lighter product which was mainly unused polypropylene suitable for recharging to the process.

An attempt was made to use sulfuric acid as catalyst instead of alkane sulfonic acid, but the oil layer recovered was only 82.5% instead of 97%, indicating considerable loss from the occurrence of side reactions. In this test the same conditions were employed as in the foregoing, except that 10 ml. of 100% $H_2SO_4$ was used. In applying the process to lighter olefins such as ethylene, propylene and butylene, it is desirable to employ elevated pressures, e. g. 100 to 300 p. s. i.

The products of the reaction between olefins and acid anhydrides give the characteristic tests for ketones. They may be employed as solvents, for example in the cellulose ester industry, as plasticizers, insecticides, insect repellants, and as intermediates in chemical processes, for example in the preparation of higher molecular weight alkyl sulfonates by interaction with sodium bisulfite and for the preparation of amino alcohols by the action of ammonia. Products having about 12 to 20 carbon atoms are preferred for insecticides and wetting agents.

Having thus described my invention what I claim is:

1. The method of preparing a high molecular weight ketone which comprises adding polypropylene boiling above about 248° F. to a mixture of acetic anhydride and a small amount of ethane sulfonic acid catalyst, agitating the mixture, separating the mixture into layers by the addition of water and recovering the desired high-boiling ketone from the polypropylene layer by distillation.

2. The method of preparing a ketone product which comprises intimately mixing an olefin and a carboxylic acid anhydride in the presence of an alkanesulfonic acid catalyst, maintaining intimate contact between said olefin and said acid anhydride until a substantial reaction has taken place with the formation of the desired ketone and thereafter recovering said ketone from said reaction mixture.

3. The method of claim 2 wherein said olefin is a propylene polymer.

4. The method of claim 2 wherein the olefin is a butylene polymer.

5. The method of preparing a ketone product which comprises intimately mixing an olefin and a carboxylic acid anhydride in the presence of an ethanesulfonic acid catalyst, maintaining said mixture at a temperature in the range of about 0 to 100° C. until a substantial reaction has taken place with the formation of the desired ketone and thereafter recovering said ketone from said reaction mixture.

CARL E. JOHNSON.

REFERENCES CITED

The following references are of record in the file of this patent:

UNITED STATES PATENTS

| Number | Name | Date |
| --- | --- | --- |
| 2,411,823 | Doumani | Nov. 26, 1946 |

OTHER REFERENCES

Ebel Helv. Chim. Acta., Vol. 10, pages 677–680 (1927).

Certificate of Correction

Patent No. 2,458,603.　　　　　　　　　　　　　　　　　　　January 11, 1949.

CARL E. JOHNSON

It is hereby certified that error appears in the above numbered patent requiring correction as follows:

In the printed specification, first page thereof, upper left-hand corner, for "Patented Jan. 4, 1949" read *Patented Jan. 11, 1949*; and that the said Letters Patent should be read with this correction therein that the same may conform to the record of the case in the Patent Office.

Signed and sealed this 17th day of May, A. D. 1949.

[SEAL]

THOMAS F. MURPHY,
*Assistant Commissioner of Patents.*